United States Patent [19]
Webb

[11] Patent Number: 5,296,880
[45] Date of Patent: Mar. 22, 1994

[54] BIFOCAL CONTACT LENS
[75] Inventor: Jimmy C. Webb, Georgetown, Tex.
[73] Assignee: Metro Optics of Austin, Inc., Pflugerville, Tex.
[21] Appl. No.: 985,160
[22] Filed: Dec. 3, 1992
[51] Int. Cl.$^5$ ............................................. G02C 7/04
[52] U.S. Cl. .................... 351/161; 351/160 R
[58] Field of Search ............ 351/160 R, 160 H, 161, 351/162

[56] References Cited
U.S. PATENT DOCUMENTS

| | | | |
|---|---|---|---|
| 25,286 | 11/1962 | De Carle | 351/161 |
| 3,279,878 | 10/1966 | Long | 351/161 |
| 3,440,306 | 4/1969 | Neefe | 351/161 |
| 3,560,598 | 2/1971 | Neefe | 351/161 |
| 3,597,055 | 8/1971 | Neefe | 351/161 |
| 3,662,040 | 5/1972 | Urbach et al. | 351/161 |
| 3,684,357 | 8/1972 | Tsuetaki | 351/161 |
| 4,618,228 | 10/1986 | Baron et al. | 351/161 |
| 4,618,229 | 10/1986 | Jacobstein et al. | 351/161 |
| 4,693,572 | 9/1987 | Tsuetaki et al. | 351/161 |
| 4,813,777 | 3/1989 | Rainville et al. | 351/161 |
| 4,938,583 | 7/1990 | Miller | 351/161 |
| 5,020,898 | 6/1992 | Townsley | 351/161 |
| 5,074,082 | 12/1991 | Capelli | 51/284 R |
| 5,076,683 | 12/1991 | Glick | 351/161 |
| 5,100,225 | 3/1992 | Rothe | 351/161 |
| 5,114,220 | 5/1992 | Baude et al. | 351/161 |

Primary Examiner—Scott J. Sugarman
Attorney, Agent, or Firm—Shaffer & Culbertson

[57] ABSTRACT

A bifocal contact lens is formed from a material having a uniform index of refraction and includes a concave posterior surface shaped in conformity with a patient's cornea and defining a lens optical axis. The bifocal contact lens includes two separate vision correction surfaces on the anterior side of the lens. A convex distance correction surface has a distance correction radius of curvature with its center of curvature at a point on a line extending parallel to, or coinciding with, the optical axis of the lens. A convex near correction anterior surface has a near correction radius of curvature with its center of curvature at a point also on the line extending parallel to, or coinciding with, the lens optical axis. The junction between the distance correction surface and the near correction surface has an upwardly opening crescent shape and comprises a step or ledge out from the distance correction surface. A method of producing the anterior surfaces for the bifocal contact lens comprises fixing a lens blank on a lathe spindle with the lens blank axis intersecting and forming an acute angle to the lathe spindle rotational axis, rotating the lens blank about the spindle rotational axis, and then cutting both the convex distance correction surface and the convex near correction surface.

4 Claims, 4 Drawing Sheets

BIFOCAL CONTACT LENS

BACKGROUND OF THE INVENTION

This invention relates to bifocal contact lenses and particularly to a bifocal contact lens structure that eliminates any vision jump between lens powers. The invention also encompasses a method and apparatus for manufacturing bifocal contact lenses, particularly, bifocal contact lenses with no vision jump between lens powers.

Bifocal lenses provide vision correction for both distance vision and up-close or near vision. As the name bifocal suggests, bifocal lenses provide the two different types of vision correction with two separate lens sections, each having a different focal length. In bifocal contact lenses, each lens must remain properly oriented on the wearer's cornea in use with the distance vision section at the top of the cornea and the near vision section at the bottom of the cornea.

There are two general categories of bifocal contact lens designs. In one bifocal contact lens design the lens has a non-uniform index of refraction. A lens of this design type is commonly referred to as a fused or two-piece lens. U.S. Pat. No. 3,662,040 to Urbach shows a two-piece or fused bifocal contact lens comprising two materials with different indices of refraction. The Urbach bifocal contact lens structure includes a lens base formed from one lens material. A lens material having a different index of refraction is fused to the lens base material in an opening formed in the lens base. The two types of material produce the desired two different vision correction powers.

The other general bifocal contact lens design, the one-piece design, is produced from a single material with a uniform index of refraction and produces the different correction powers with a non-uniform curvature on the outer or anterior surface of the lens. U.S. Pat. No. 5,074,082 to Cappelli and U.S. Pat. No. 4,938,583 to Miller show one-piece bifocal contact lens designs. In both the Cappelli and Miller lens designs, the anterior surface of the lens includes two separate sections, each with a different radius of curvature with respect to the curvature of the lens inner or posterior surface. The two sections with dissimilar curvature produce the desired two lens powers.

Both the fused and prior one-piece bifocal lens designs had drawbacks that prevented their wide spread acceptance and use. Both designs relied only upon asymmetry built into the lens shape or weight distribution to maintain proper orientation of the lens on the patient's cornea. The two-piece or fused bifocal contact lenses were relatively expensive to manufacture and were also thicker and, therefore, less comfortable to wear. Also, the two-piece design limited the types of materials that could be employed in the lens. Furthermore, there was the risk that the fused portion of the two-piece design could detach from the base portion of the lens.

The one-piece bifocal contact lenses were thinner and generally less expensive to manufacture. However, the prior one-piece lens designs produced a vision jump or vision distortion at the junction between the two different lens powers. The vision jump or distortion between the lens powers was distracting to the wearer and limited the acceptance of such designs.

SUMMARY OF THE INVENTION

It is an object of the invention to provide a bifocal contact lens that overcomes the above-described problems and others associated with prior bifocal contact lenses. More particularly, it is an object of the invention to provide a one-piece bifocal contact lens that substantially eliminates any jump or distortion at the junction between the two lens powers. Another object of the invention is to provide a method and apparatus for producing bifocal contact lenses, particularly, such lenses that exhibit no vision jump between lens powers.

In order to accomplish these objects, a one-piece bifocal contact lens according to the invention has a unique alignment between its two separate anterior side lens surfaces. Unlike the prior one-piece lens designs, the centers of curvature for both lens sections in the present lens design lie on the optical axis of the lens or at least a line parallel to the lens optical axis.

The present bifocal contact lens is comprised of a single lens material having a uniform index of refraction. The lens includes a generally spherical posterior or inner surface that conforms to a patient's cornea. A line extending normal to the geometric center of the posterior surface defines the lens optical axis. The anterior or outer side of the lens includes a convex distance correction surface having a distance radius of curvature and a convex near correction surface having a shorter near correction radius of curvature. According to the invention, the center of curvature for the distance correction surface and the center of curvature for the near correction surface both lie on a line that is parallel to, or coincides with, the optical axis of the lens. This center of curvature alignment of the two lens sections eliminates the jump or vision distortion at the junction of the two lens sections.

The bifocal lens structure according to the invention also preferably includes a unique junction between the distance and near correction surfaces. The junction forms an upwardly opening crescent shape and includes a small outward step from the distance correction surface to the near correction surface. The upwardly opening crescent shaped step cooperates with the eyelid to maintain the correct orientation of the lens on the patient's cornea.

The present method of manufacturing bifocal contact lenses includes first fixing a lens blank on a lathe spindle with an anterior side of the lens blank facing away from the spindle and the lens blank axis intersecting and forming an acute angle with the spindle rotational axis. After the lens blank is fixed at the desired angle to the spindle rotational axis, the method includes rotating the lens blank about the lathe rotational axis and cutting both the convex distance correction surface and the convex near correction surface. Polishing both the distance and near correction surfaces and their junction with suitable polishing tools produces the final anterior surface for the contact lens.

Cutting both anterior correction surfaces includes rotating a cutting tool through an arc having the desired radius of curvature and a center of curvature on the desired line, either the lens blank axis or a line parallel to the lens blank axis. As with any lathe operation, cutting the correction surfaces preferably includes sweeping the cutting tool back and forth through the desired arc length and advancing the tool in small increments to remove the desired amount of material and reach the desired radius of curvature.

Although the distance correction surface must be produced with the lens blank fixed with its axis at an acute angle to the spindle axis, the near correction surface of the lens may be produced with the lens blank fixed at an acute angle to the spindle axis or aligned with the spindle axis. Also, the method of the invention may include producing an intermediate anterior surface before cutting the distance correction surface and then the nea correction surface. As with the near correction surface the intermediate surface may be cut with the lens axis either at an angle to the spindle rotational axis or aligned with the spindle rotational axis.

The apparatus pursuant to the invention for manufacturing bifocal contact lenses includes a lathe with a spindle capable of rotating about a spindle rotational axis. Connected to the spindle is a lens blank offsetting device or means on which a lens blank may be fixed with the lens blank axis at an acute angle to the spindle rotational axis. Adjustment means associated with the lens blank offsetting means facilitates adjusting the lens blank position along the lens blank axis within a range of distances from the spindle rotational axis.

The manufacturing method and apparatus according to the invention produce the desired one-piece bifocal contact lens with the two anterior correction surfaces each having their respective center of curvature on the optical axis of the lens or on a line parallel to the lens optical axis. Also, cutting the distance surface into the lens blank with the lens blank at an angle to the spindle produces the upwardly opening crescent-shaped junction between the two lens anterior surfaces. This upwardly opening crescent-shaped junction makes the patient's vision less sensitive to lens rotation with respect to the eye, while the step at the junction helps retain the proper lens orientation as discussed above.

These and other objects, advantages, and features of the invention will be apparent from the following description of the preferred embodiments, considered along with the accompanying drawings.

DESCRIPTION OF THE PREFERRED EMBODIMENTS

Figure 2:
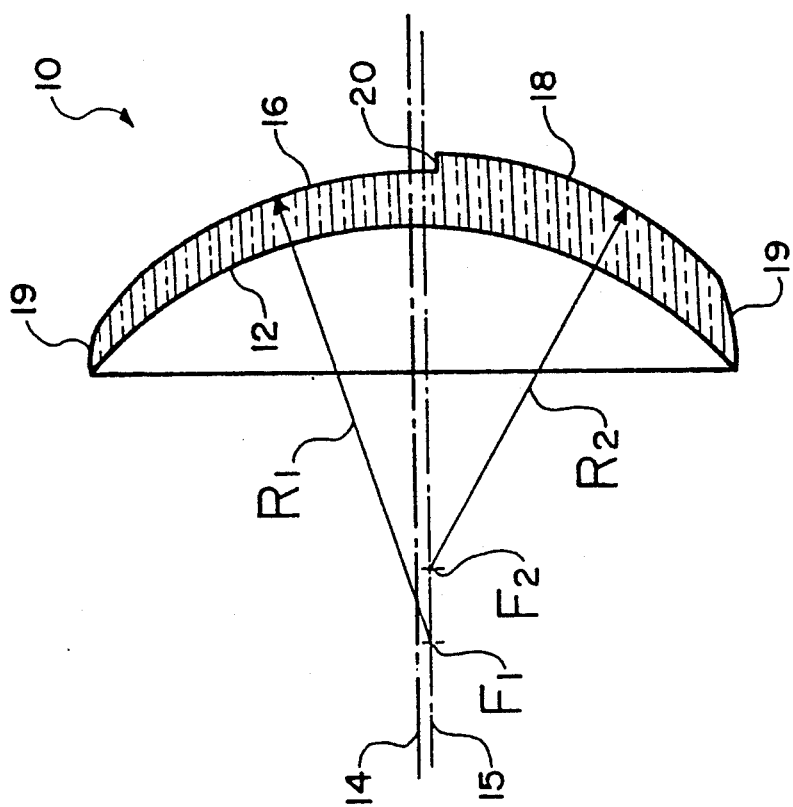
FIG. 2 is a view in section taken along line 2—2 in FIG. 1.
Figure 1:
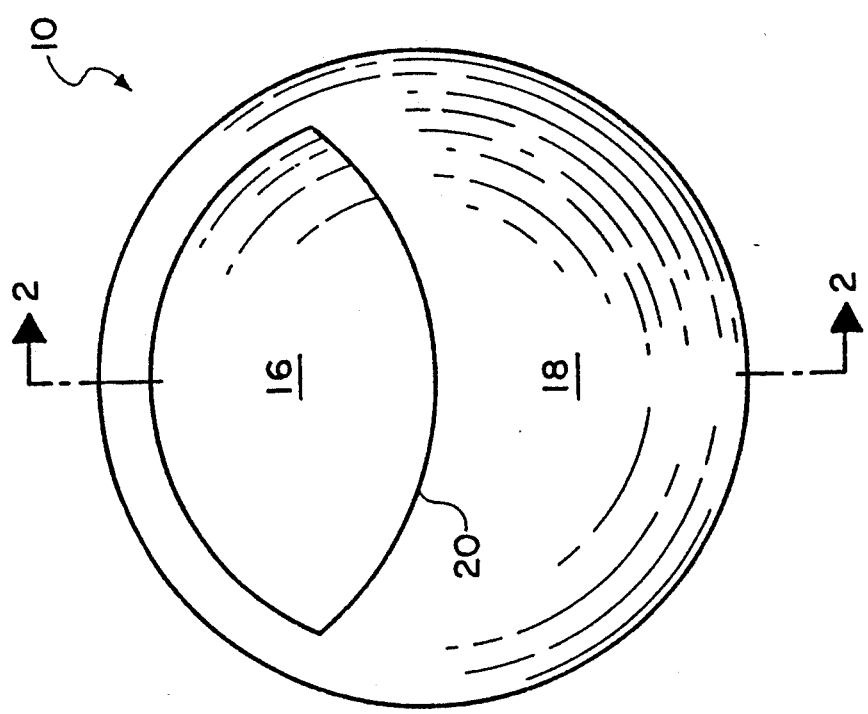
FIG. 1 is a front view of a bifocal contact lens embodying the principles of the invention.

FIGS. 1 and 2 show one preferred form of bifocal contact lens 10 embodying the principles of the invention. The lens 10 includes a concave posterior surface 12 that is generally spherical and adapted to conform to the patient's cornea (not shown). A line extending normal to the geometric center of the lens posterior surface 12 defines a lens optical axis 14. The anterior side of the lens 10 includes two separate surfaces, a convex distance correction surface 16 and a convex near correction surface 18. The lens 10 also preferably includes a tapered surface 19 on the anterior side of the lens around the lens edge.

Those skilled in the art will readily appreciate that the lens 10 is properly oriented on the patient's cornea with the near correction surface 18 of the lens positioned generally at the bottom of the cornea and the distance correction surface 16 at the top. The lens 10 must remain generally in this position in order to provide the desired vision corrections. Also, those skilled in the art will readily appreciate that the lens provides the two desired vision corrections by the different curvatures of the two correction surfaces 16 and 18 with respect to the curve of the posterior surface 12.

The body of the lens 10 is made from a material having a uniform index of refraction. Any suitable contact lens material may be employed, including hard contact lens materials, gas permeable materials, and soft contact lens materials. Although any contact lens material may be employed in the contact lens according to the invention, the preferred material is FLUOROPERM 60 marketed by Paragon Optical, Inc.

An best shown in FIG. 2, the distance correction surface 16 has a radius $R_1$ and a center of curvature shown at $F_1$. The near correction surface 18 has a radius of curvature $R_2$ with a center of curvature at $F_2$. The different curvatures are required in the one-piece design to produce the desired two types of vision correction. According to the invention, however, the centers of curvature $F_1$ and $F_2$ lie either on the optical axis 14 of the lens or, as shown in FIG. 2, on a line 15 extending parallel to the lens optical axis. Whether aligned on the lens optical axis 14 or aligned on a line extending parallel to the lens optical axis such as the line 15, the alignment of the two centers of curvature $F_1$ and $F_2$ eliminates the jump or distortion between the two lens powers. Thus, the patient's vision is continuous throughout the lens and the junction between lens powers does not produce a gap or jump in vision as the eye moves from the distance correction portion of the lens defined by the surface 16 to the near correction portion of the lens defined by the surface 18 and vice versa.

Still referring to FIGS. 1 and 2, the distance and near lens surfaces 16 and 18 meet at a junction 20. The preferred junction 20 forms an upwardly opening crescent shape as shown particularly in FIG. 1. This upwardly opening crescent shape makes the patient's vision less sensitive to the rotation of the lens on the patient's eye because more rotation is required to place the two lens sections in incorrect position with respect to the eye. Also, as shown particularly in FIG. 2, the junction 20 between distance and near correction surfaces on the anterior side of the lens according to the invention includes an outward step from the distance correction surface 16 to the near correction surface 18 to produce a slight ledge along the junction. This junction step or ledge is required when the centers of curvature of both lens sections are aligned on a common line either coincident with or parallel to the lens optical axis. The crescent-shaped step or ledge junction 20 also produces the added benefit of cooperating with the movement of the patient's eyelid to maintain the position of the lens in the desired orientation with respect to the eye, that is, with the near correction surface 18 at the bottom of the cornea and the distance correction surface 16 at the top of the cornea. Movement of the eyelid over the upwardly opening crescent-shaped junction step 20 tends to prevent the contact lens from rotating significantly with respect to the cornea.

As shown best in FIG. 2, the preferred contact lens 10 according to the invention has its posterior surface 12 and thus the optical axis 14 somewhat offset upwardly from the line 15 on which points $F_1$ and $F_2$ reside. The line 15 shown in FIG. 2 coincides with an axis of the lens blank material from which the lens 10 is produced. This upward offset of the posterior surface 12 produces a thicker bottom portion adjacent to the lens section having the near correction surface 18. The added weight of the thicker bottom section tends to bias the lens to the appropriate position on the patient's cornea with the near correction surface 18 at the bottom of the cornea and the distance correction surface 16 at the top.

Figure 3:
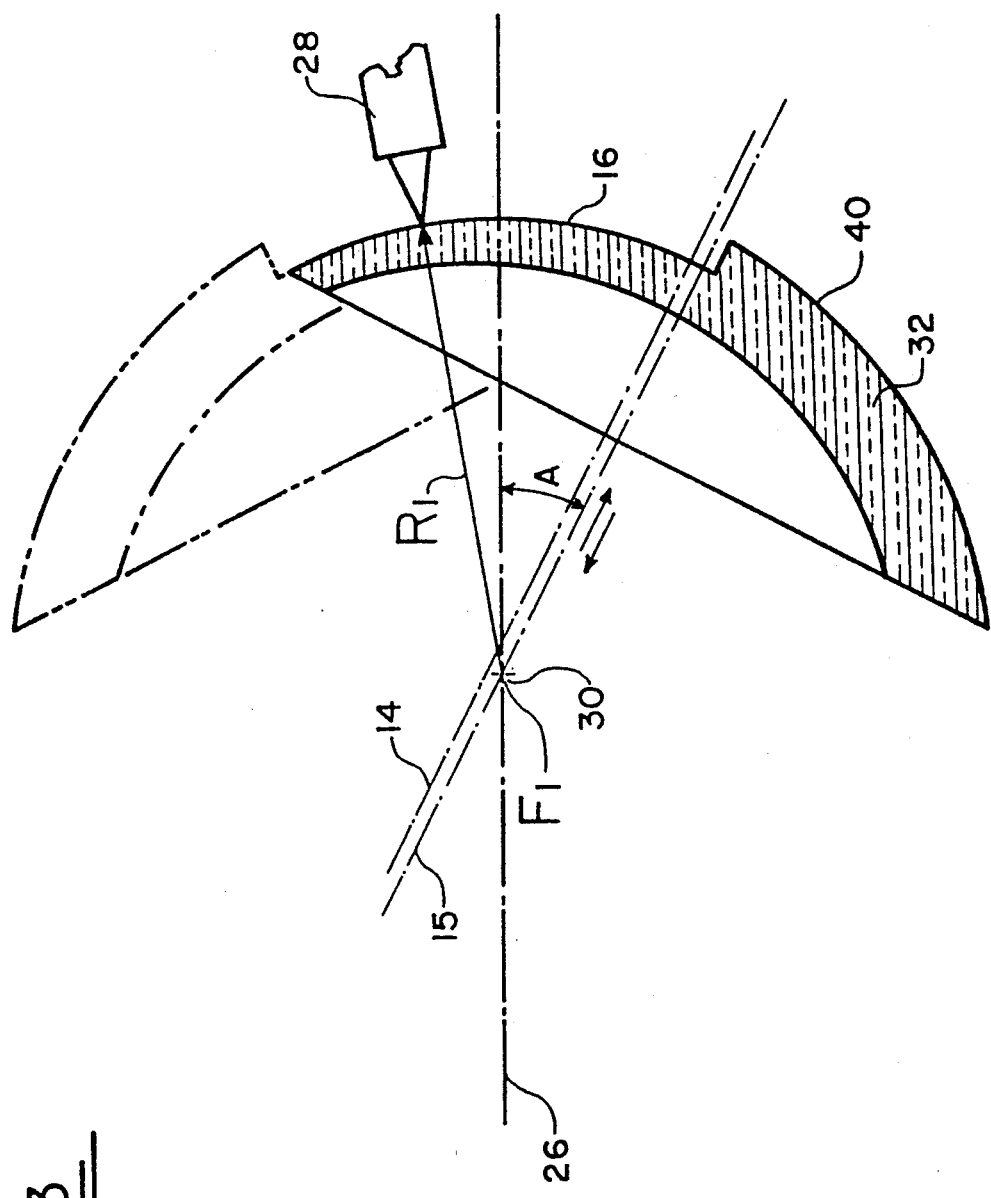
FIG. 3 is a diagrammatic view of a lens blank mounted on a lens manufacturing apparatus embodying the principles of the invention set to cut the distance correction surface of the lens.
Figure 4:
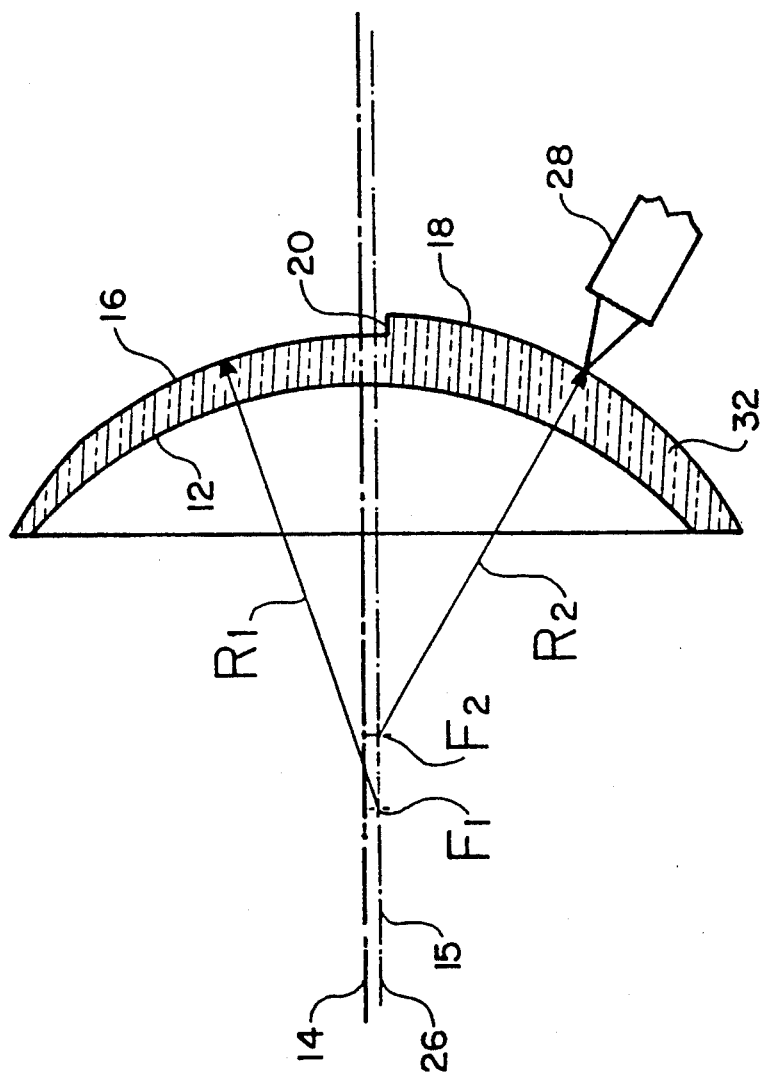
FIG. 4 is a diagrammatic view of a lens blank mounted on the preferred lens manufacturing apparatus for cutting the near correction surface of the lens.
Figure 5:
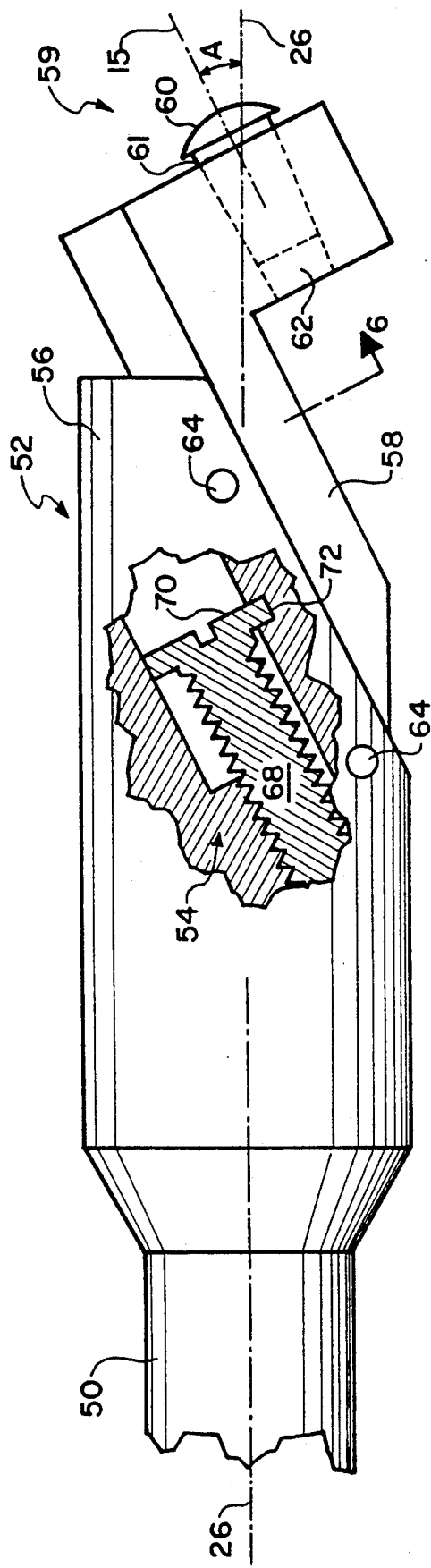
FIG. 5 is a side view of a lens manufacturing apparatus embodying the principles of the invention partially cut away in longitudinal section.
Figure 6:
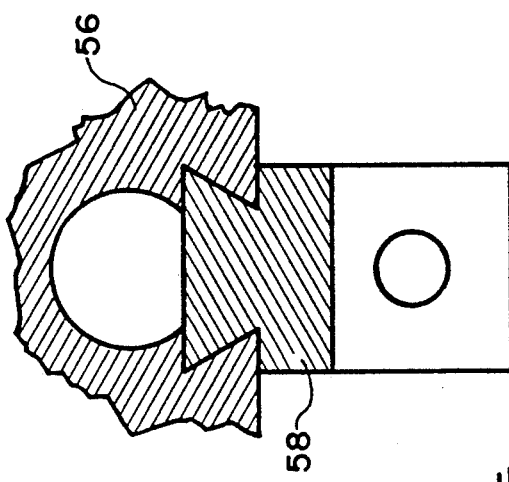
FIG. 6 is a transverse section view taken along line 6 in FIG. 5.

Although the lens embodying the principles of the invention may be manufactured by moulding or any other suitable technique, the preferred method utilizes a suitable lathe having a spindle adapted to rotate about a spindle axis 26 as shown in FIGS. 3 and 4. The lathe also includes a cutting tool 28 adapted to be swept back and forth through a desired arc length at any desired radius within a certain range. The diagrammatic FIGS. 3 and 4 show the lens position with respect to the spindle axis during the manufacturing method, but do not show the spindle itself or the device by which the lens material is fixed on the spindle, both of which are shown in FIGS. 5 and 6. Also, FIGS. 3 and 4 do not show the structure on which the cutting tool 28 is manipulated but rather simply show the cutting tool pivot point 30, because any supporting structure allowing the cutting tool 28 to pivot precisely about a single point may be used in an apparatus embodying the principles of the invention.

The method of producing the bifocal contact lens according to the invention includes first fixing a block of lens material 32, commonly referred to as a lens blank, on the spindle (not shown) with the lens blank axis 15 at an acute angle A, preferably 27°, to the spindle rotational axis 26. The lens blank axis 15 may be defined as a line extending transversely through the geometric center of the lens blank 32.

Once fixed at the acute angle A to the spindle rotational axis 26, the method includes rotating the lens blank 32 about the spindle axis and cutting first the distance surface 16 and then the near correction surface 18. The method of producing the basic concludes with the step of polishing the two anterior surfaces 16 and 18 and junction 20 between the two surfaces. If desired, however, the lens may be provided with a desired edge shape such as in the lens 10 shown in FIG. 1 and the edge forming step is usually the last step in the lens producing process.

In the preferred form of the invention, the method includes first producing the posterior surface 12 on the lens blank material 32 and then producing an intermediate anterior surface 40 (shown in FIG. 3) before cutting the distance and near surfaces. The preferred immediate surface 40 has a radius of curvature similar to the final distance correction surface 16 but leaves sufficient lens thickness on the lens blank 32 to produce the final anterior surfaces 16 and 18 at the desired final lens thickness. Although the intermediate surface 40 may be cut with the lens blank axis 15 offset at an angle similar to the position shown in FIG. 3, the preferred method includes cutting the intermediate surface on the lens blank axis aligned with or parallel to the spindle axis 26.

Those skilled in the art will readily appreciate that the step of cutting the anterior surfaces 16 and 18 with the cutting tool 28 includes sweeping the cutting tool back and forth about pivot point 30 and through the desired arc length while incrementally advancing the cutting tool relative to the lens blank material 32. The slow incremental advancement between the cutting tool 28 and lens blank material 32 removes the lens blank material without placing excessive force on the cutting tool or on the lens blank and its supporting structure.

The step of cutting the distance correction surface 16 is critical to providing the desired center of curvature alignment between the distance and near correction surfaces. The preferred method of cutting the distance surface 16 first including setting the cutting tool 28 at the desired final radius $R_1$ with respect to its pivot point 30 plus a distance corresponding to the thickness of material to be removed from the lens blank 32 to produce the desired final lens thickness. After setting the cutting tool 28 the method includes advancing the lens blank 32 along an axis offset at angle A until the lens blank material contacts the cutting tool. Then, after backing the cutting tool 28 out of contact with the lens blank material and rotating the offset lens blank 32 about the spindle axis 26, the method includes sweeping the cutting tool back and forth and incrementally advancing the cutting tool toward the lens blank material, thereby decreasing the cutting tool radius until it reaches the desired distance radius $R_1$. At this point, the desired amount of material has been removed from the lens blank and the area across which the cutting tool 28 has been swept has the desired radius of curvature $R_1$ for the distance vision correction.

As with the intermediate surface 40, the step of cutting the near correction surface 18 may be performed with the lens blank axis 15 at an angle to the spindle axis similar to the position shown in FIG. 3, or with the lens blank axis aligned with, or parallel to, the spindle rotational axis 26. As shown in FIG. 4, however, the preferred step of cutting the near correction surface 18 is performed with the lens blank axis 15 aligned with, or parallel with to, the spindle axis 26 and thus the method according to the invention includes aligning the lens blank 32 with its axis parallel to the spindle axis 26 after cutting the distance correction surface 16. As with the other cutting steps, the step of cutting the near correction surface 18 includes advancing the cutting tool 28 incrementally relative to the lens blank 32 while sweeping the cutting tool back and forth through the desired arc until reaching the desired near correction radius $R_2$ and lens thickness.

The step of polishing the distance and near correction surfaces, 16 and 18 respectively, and the junction 20 may be performed after cutting both surfaces. However, in the preferred method of the invention, the polishing steps are performed immediately after the steps of cutting the respective surfaces 16 and 18. Thus the preferred method of the invention includes polishing the distance correction surface 16 by rotating the lens blank 32 while offset at the angle A shown in FIG. 3 and pressing a suitable polishing tool (not shown) against the surface and the ledge at the junction 20. The POLYPAD II polishing tool marketed by Polychem, Inc. is one example of a polishing tool suitable for use in the manufacturing method of the invention. Similarly, the step of polishing the near correction surface 18 includes rotating the lens blank 32 about the spindle axis 26 and then bringing a suitable polishing tool into contact with the lens near correction surface 18. The junction 20 is polished as the polishing tool laps against the junction while polishing the surfaces 16 and 18.

FIGS. 5 and 6 show a portion of an apparatus embodying the principles of the invention for producing bifocal contact lenses. In addition to the spindle 50, the apparatus includes a cutting tool and cutting tool support structure which are not shown in FIGS. 5 and 6 but are described with reference to FIG. 3. According to the invention, the lens manufacturing apparatus includes offsetting means 52 and adjusting means 54. The preferred offsetting means 52 includes a base 56 connected to the spindle 50 and a moveable section 58 slideably mounted on the base 56. The moveable section 58 is adapted to receive a suitable lens holding tool or arrangement 59 that includes a spherical surface 60 corresponding to the previously cut lens posterior surface, and a tapered stem 61 by which the tool is mounted on the moveable section 58 in tapered opening 62. A thin layer of adhesive material known as pitch in the contact lens manufacturing industry holds the lens blank (not shown) on the spherical surface 60 of the holding tool 59. The moveable section 58 and lens holding tool 59 cooperate to rigidly hold the lens blank on the base 56 with an anterior side of the lens blank facing away from the spindle 50 and the lens blank axis 15 offset at the desired angle A to the spindle axis 26 and intersecting the spindle axis. The slidable connection between moveable section 58 and base 56 facilitates varying the distance between mounted lens blank on surface 60 and the spindle axis 26 along the lens blank axis 15. Tension set screws 64 on the base 56 may be fixed to facilitate sliding the moveable section 58 to the desired position with minimum play between the base 56 and section 58.

The adjusting means 54 comprises a suitable adjusting mechanism between the base 56 and moveable section 58 of the offsetting means 52 capable of fixing the moveable section at a desired position along the lens blank axis 15. In the illustrated preferred form of the invention the adjusting means 54 comprises an adjusting screw 68 threaded into the base 56 parallel to the track on which the moveable section 58 slides relative to the base. The head 70 of the screw 68 extends into a slot 72 formed in the moveable section 58. Thus, threading the screw 68 in and out of the base 56 moves the section 58 along its slidable connection with the base.

The above described preferred embodiments are intended to illustrate the principles of the invention, but not to limit the scope of the invention. Various other embodiments and modifications to these preferred embodiments may be made by those skilled in the art without departing from the scope of the following claims. For example, the acute angle A shown in FIGS. 3 and 5 could be substantially any acute angle according to the invention even though 27° is preferred.

I claim:

1. A bifocal contact lens formed from a material having a uniform index of refraction and having a concave posterior surface shaped in conformity with a patient's cornea and defining an optical axis, the bifocal contact lens comprising:
    (a) a convex distance correction anterior surface located at an upper portion of the lens and having a distance correction radius of curvature with a center of curvature at a point on a first line extending at least parallel to the optical axis of the lens;
    (b) a convex near correction anterior surface located at a bottom portion of the lens and having a near correction radius of curvature with a center of curvature at a point on the first line; and
    (c) a junction between the distance and near correction surfaces having generally a crescent shape that opens toward the upper portion of the lens and that extends substantially across an entire optical zone of the lens.

2. The bifocal contact lens of claim 1 wherein:
    (a) the first line coincides with the lens optical axis.

3. The bifocal contact lens of claim 1 wherein the junction between the distance and near correction surfaces includes an outward step from the distance correction surface to the near correction surface.

4. The bifocal contact lens of claim 1 wherein:
    (a) the optical axis of the lens extends through the distance correction surface.

* * * * *